United States Patent
Jin et al.

(10) Patent No.: US 9,653,746 B2
(45) Date of Patent: May 16, 2017

(54) MANIFOLD FOR REDOX FLOW BATTERY FOR REDUCING SHUNT CURRENT AND REDOX FLOW BATTERY COMPRISING SAME

(71) Applicant: KOREA INSTITUTE OF ENERGY RESEARCH, Daejeon (KR)

(72) Inventors: Chang-Soo Jin, Daejeon (KR); Jae-Deok Jeon, Daejeon (KR); Bum-Suk Lee, Daejeon (KR); Joonmok Shim, Daejeon (KR); Kyoung-Hee Shin, Daejeon (KR); Sea-Couk Park, Daejeon (KR); Myung Seok Jeon, Daejeon (KR); Kyu-Nam Jung, Daejeon (KR); Sun-Hwa Yeon, Daejeon (KR); Sukeun Yoon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 99 days.

(21) Appl. No.: 14/417,895

(22) PCT Filed: Jan. 25, 2013

(86) PCT No.: PCT/KR2013/000617
§ 371 (c)(1),
(2) Date: Jan. 28, 2015

(87) PCT Pub. No.: WO2014/035020
PCT Pub. Date: Mar. 6, 2014

(65) Prior Publication Data
US 2015/0180074 A1   Jun. 25, 2015

(30) Foreign Application Priority Data
Aug. 28, 2012 (KR) .................. 10-2012-0094334

(51) Int. Cl.
*H01M 8/18* (2006.01)
*H01M 8/0258* (2016.01)
(Continued)

(52) U.S. Cl.
CPC .......... *H01M 8/188* (2013.01); *H01M 8/026* (2013.01); *H01M 8/0258* (2013.01); *H01M 8/20* (2013.01); *Y02E 60/528* (2013.01)

(58) Field of Classification Search
CPC ............................. H01M 8/188; H01M 8/20
See application file for complete search history.

(56) References Cited

U.S. PATENT DOCUMENTS

| | | | |
|---|---|---|---|
| 7,842,411 B2 | 11/2010 | Na et al. | |
| 8,119,306 B2 | 2/2012 | Choi et al. | |
| 2011/0223450 A1* | 9/2011 | Horne | B60L 11/1824 429/72 |

FOREIGN PATENT DOCUMENTS

| | | | |
|---|---|---|---|
| CN | 201444488 | * | 4/2010 |
| JP | 2002175822 | * | 6/2002 |

(Continued)

OTHER PUBLICATIONS

International Search Report—PCT/KR2013/000617 dated Apr. 1, 2013.

*Primary Examiner* — Ula C Ruddock
*Assistant Examiner* — Thomas Parsons
(74) *Attorney, Agent, or Firm* — Cantor Colburn LLP

(57) ABSTRACT

A manifold for a redox flow battery capable of effectively suppressing a shunt current has a supply flow pathway and an exhaust flow pathway respectively formed at a left side and a right side of an anode or cathode electrode electrolyte reaction unit so as to include a U-shaped curved portion, and the U-shaped curved portion is formed to be positioned on the upper part of the top or the lower part of the bottom of the first electrode electrolyte reaction unit. When the mani- (Continued)

fold is applied to a redox flow battery, the supply flow pathway and the exhaust flow pathway having the U-shaped curved portion are formed on the upper part of the top or the lower part of the bottom of the electrode electrolyte reaction unit to prevent an electrolyte existing in the inside of a stack and a pipe from passing through the U-shaped curved portion.

9 Claims, 3 Drawing Sheets

(51) Int. Cl.
  *H01M 8/026* (2016.01)
  *H01M 8/20* (2006.01)

(56) References Cited

FOREIGN PATENT DOCUMENTS

| JP | 2003223922 | | 8/2003 |
|----|------------|---|--------|
| JP | 2004319341 | * | 11/2004 |
| KR | 100647666 | | 11/2006 |
| KR | 100874072 | | 12/2008 |

* cited by examiner

MANIFOLD FOR REDOX FLOW BATTERY FOR REDUCING SHUNT CURRENT AND REDOX FLOW BATTERY COMPRISING SAME

TECHNICAL FIELD

The present invention relates to a manifold for a redox flow battery capable of effectively suppressing a shunt current and a redox flow battery comprising the same.

BACKGROUND ART

Recently, as the weight of the renewable energy is increasing, power storage devices are drawing attention as a new alternative which can overcome the problems of flexibility in power production and misalignment in the timing of seasonal demand and supply. Accordingly, research and development on power storage devices are actively in progress.

The secondary batteries for large capacity power storage are lead storage battery, NaS battery, redox flow battery (RFB), and the like.

Especially the redox flow battery has features in that the maintenance cost is low while it is operable at room temperature, furthermore, the capacity and the output can be designed independently. So many researches of the redox flow battery are in progress for a large capacity secondary battery.

Generally, a redox flow battery, as illustrated in FIG. 1, includes: a positive cell 210; a negative cell 220; a separating membrane 230, formed between the positive cell 210 and the negative cell 220; a positive electrolyte tank 280, wherein positive electrolyte is stored for supplying positive electrolyte to the positive cell 210 by driving the pump 281; and a negative electrolyte tank 290, wherein negative electrolyte is stored for supplying negative electrolyte to the negative cell 220 by driving the pump 291.

The positive cell 210 and the negative cell 220 may be stacked in multiple layers, and a current collector and an end plate are disposed at the outer sides of the outermost positive cell 210 and the outermost negative cell 220.

Generally, each of the positive cell 210 and the negative cell 220 includes a felt electrode, a bipolar plate, and a manifold containing electrolyte flow path.

In the redox flow battery, the electrolyte includes a redox couple, and the reduction oxidation reaction occurs in the positive cell 210 and the negative cell 220 according to charging and discharging.

For example, when a vanadium couple is used as redox couple, the reactions occurring at the positive cell 210 and the negative cell 220 are as follows.

Positive electrode: 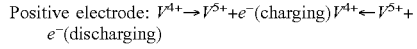

Negative electrode: 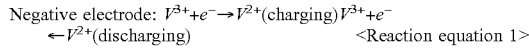     <Reaction equation 1>

Generally, the redox flow battery of this structure is used in the factories and the like, as an emergency power source in a form wherein the positive cell 210 and the negative cell 220 are multiply stacked.

Since the redox flow battery, which is used as an emergency power source, is being kept in a charged state and operated only in an emergency situation, may have a long standby time.

Thus, when the standby time of the redox flow battery is getting longer, the shunt current is generated.

In other words, when the standby time of the redox flow battery is getting longer, self-discharge is occurring since a electrochemical reaction is generated as the active materials, which are dissolved in the electrolytes existing inside of the positive cell 210 and the negative cell 220 of the stack, are moving towards the opposite side through the separating membrane 230.

In addition to this, more self-discharge is occurring when the massive amount of electrolytes remaining in the pipes 282, 292 and the like which are the flow paths of the electrolytes installed for supplying electrolytes to the positive cell 210 and the negative cell 220.

Since energy must be applied in order to recharge the electrolytes discharged in such a way, there is no way to avoid a power loss.

In order to avoid occurrence of a shunt current in a way as described above, when a redox flow battery is installed, the pipes 282, 292 and the electrolyte tanks 280, 290 are positioned low such that the remaining electrolytes inside the stack or the pipes 282, 292 and the like can be moved towards the electrolyte tanks 280, 290 when the operation is stopped.

However, when the pipes 282, 292 and the electrolyte tanks 280, 290 are installed in a low position, there are problems in that the embrittlement may be weakened since the separating membrane 230, which is existing inside the stack, may be kept dried. Moreover, more or less longer time is required for charging and discharging since charging and discharging starts only when the electrolytes stored in the electrolyte tanks 280, 290 are supplied into the stack using the pumps 281, 291 when charging and discharging (the battery).

SUMMARY OF INVENTION

Technical Problem

An objective of the present invention for solving the above described problems is to provide a manifold for a redox flow battery which may suppress the generation of a shunt current by blocking the movements of the electrolytes existing inside of the stack and the pipes via the flow paths or the pipes when the operation of the pumps are stopped.

Another objective of the present invention is to provide a redox flow battery capable of enhancing the efficiency through suppressing the generation of a shunt current by equipping with the manifold.

Solution to Problem

In order to achieve the above object, the present invention provides a manifold for a redox flow battery disposed on one side or on both sides of a plate, comprising: a first electrode electrolyte inlet and a first electrode electrolyte outlet for supplying and exhausting of the first electrode electrolyte; a first electrode electrolyte reactor installed inside; a supplying flow path for supplying the first electrode electrolyte injected from the first electrode electrolyte inlet into the first electrode electrolyte reactor; an exhausting flow path for moving the first electrode electrolyte of the first electrode electrolyte reactor to the first electrode electrolyte outlet, and exhausting therefrom; and a second electrode electrolyte inlet and a second electrode electrolyte outlet for moving the second electrode electrolyte, wherein the supplying flow path and the exhausting flow path include U-bends at a left side and at a right side of the first electrode electrolyte reactor, respectively, and the U-bends are formed to be positioned above a top end or below a bottom end of the first electrode electrolyte reactor.

It may be that the first electrode electrolyte inlet is formed at a lower left portion of the first electrode electrolyte reactor, one end portion of the supplying flow path is connected to the first electrode electrolyte inlet while the other end portion thereof is connected to the lower end portion of the first electrode electrolyte reactor, and one of the U-bends formed in the supplying flow path is being bent from a top left side of the first electrode electrolyte reactor towards downward direction; and the first electrode electrolyte outlet is being formed at a top right portion of the first electrode electrolyte reactor, one end portion of the exhausting flow path is connected to the first electrode electrolyte outlet while the other end portion thereof is connected to a top end portion of the first electrode electrolyte reactor; and the other one of the U-bends formed in the exhausting flow path is being bent from a bottom right side of the first electrode electrolyte reactor towards upward direction.

A felt electrode may be attached to the first electrode electrolyte reactor. The first electrode electrolyte reactor may be formed by forming a groove or a hole in the plate, and the felt electrode may be inserted and fixed in the groove or the hole.

The first electrode electrolyte reactor, the supplying flow path, and the exhausting flow path may be formed on one side of the plate, and a bipolar plate may be attached to a backside thereof.

The bipolar plate is inserted into the backside groove which is formed on the backside surface of the plate, and the bipolar plate may have a larger area than the first electrode electrolyte reactor.

The first electrode electrolyte is a positive electrolyte or a negative electrolyte, and the second electrode electrolyte may be a negative electrode electrolyte or a positive electrode electrolyte which is an opposite polarity of the first electrode electrolyte.

In order to achieve the above described another object, the present invention provides a redox flow battery comprising a manifold according to the present invention.

Advantageous Effects of Invention

When applying a manifold according to the above described structure of the present invention to a redox flow battery, by forming a supplying flow path and an exhausting flow path, which have U-bends, above the top end and below the bottom end of the electrode electrolyte reactor, it is effective in suppressing the generation of a shunt current since the electrolytes existing inside of the stack and the pipes cannot pass the U-bends, thereby blocking the movement of the electrolytes through the flow paths or the pipes and the like when the operation of the pumps of the redox flow battery is stopped.

DETAILED DESCRIPTION OF EMBODIMENT

Hereinafter the present invention will be described more in detail as follows.

Figure 1:
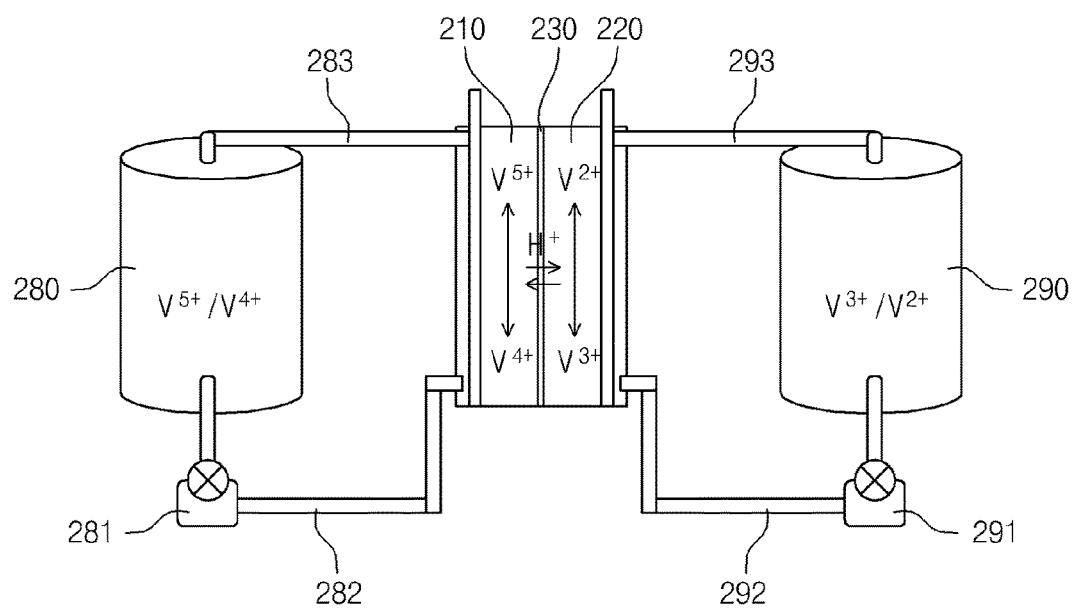
FIG. 1 is a drawing showing the outline of a redox flow battery of the prior art.
Figure 2:
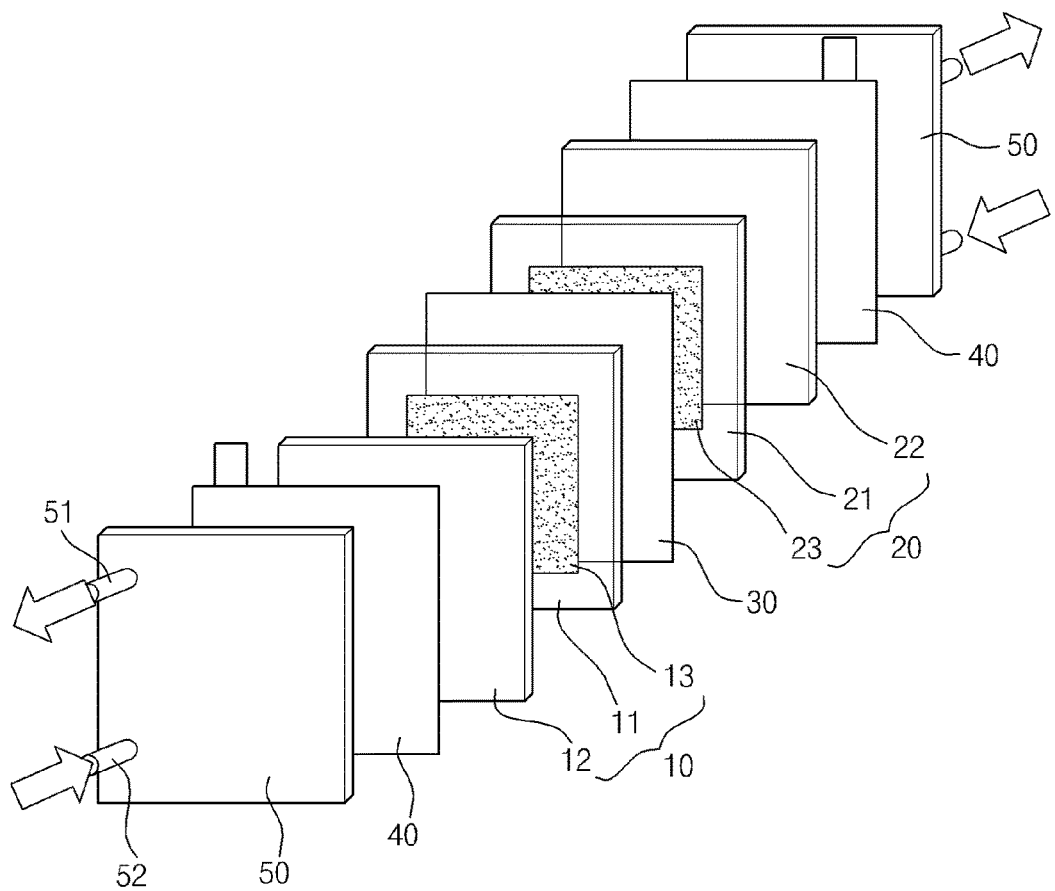
FIG. 2 is a drawing showing the outline of a redox flow battery including a manifold according to the present invention.

FIG. 2 is a drawing showing the outline of a redox flow battery including a manifold according to the present invention.

As illustrated in FIG. 2, a redox flow battery according to the present invention may include: a positive felt electrode 13, a positive cell 10 which includes a positive manifold 11 and a bipolar plate 12; a negative cell 20 which includes a negative manifold 21 and a bipolar plate 22; and a separating membrane 30 formed between the positive cell 10 and the negative cell 20.

The positive cell 10 and the negative cell 20 may be stacked in multiple layers, and at this time, a current collector 40 and an end plate 50 are disposed at the outer sides of the outermost positive cell 10 and the outermost negative cell 20.

In the end plate 50, an electrolyte inlet 52 and an electrolyte outlet 51 are provided. Although not shown in the drawing, the redox flow battery further includes a positive electrolyte tank wherein positive electrolytes are stored; a negative electrolyte tank wherein negative electrolytes are stored; and a pump formed for the circulation of the positive electrolytes and the negative electrolytes.

The end plate 50 performs a role which forms the outline of the overall redox flow battery, and an electrolyte inlet 52 and an electrolyte outlet 51 are formed therein, it may be easily formed if paths for supplying or for exhausting the electrolytes are formed in a conventional plate which is commonly used in the art.

In here, the electrolyte inlet 52 and the electrolyte outlet 51 are connected to the positive electrolyte tank and the negative electrolyte tank, and the positive electrolyte and the negative electrolyte are being circulated by driving the pump further provided.

The end plate 50 may be formed by using insulating materials.

For example, the end plate 50 may be formed by using polymers such as polyethylene (PE), polypropylene (PP), polystyrene (PS), polyvinyl chloride (PVC), and the like, and PVC is preferred considering the price, availability of procurement, and the like.

The current collector 40 is a path for the moving electrons, and receives electrons from the outside when charging the battery or ejects electrons to the outside when discharging the battery.

Such current collector 40 is commonly used in the art, and the material thereof is not especially limited, for example, copper or brass may be used.

Each of the positive cell 10 and the negative cell 20 includes a felt electrode, a manifold, and a bipolar plate respectively. In other words, the positive cell 10 includes a positive felt electrode 13, a positive manifold 11, and a bipolar plate 12; and the negative cell 20 includes a negative felt electrode 23, a negative manifold 21, and a bipolar plate 22.

In here, the positive felt electrode 13 and the negative felt electrode 23 (hereinafter simply referred to as 'felt electrode') provide active sites for oxidation and reduction of the electrolytes, and anything generally used in the art may be used without limitation.

For example, felt, carbon fiber, carbon paper, and the like may be used for the felt electrodes 13, 23. Preferably, the felt electrodes 13, 23 may be a carbon fiber felt electrode made of polyacrylonitrile (PAN) series or Rayon series.

The positive manifold 11 and the negative manifold 21 include flow paths for the movement of the positive electrolytes or the negative electrolytes. Since the most important feature of the present invention is in the structural formation of the flow paths in the positive manifold 11 and the negative manifold 21, it will be described more in detail hereinafter.

In one side of the positive manifold 11 and the negative manifold 21, a groove or a hole may be formed for inserting the felt electrodes 13, 23 therein.

Alternatively, in one side of the positive manifold 11 and the negative manifold 21, a groove may be formed for insertion of the felt electrodes 13, 23 therein, and in the other side thereof a groove may be formed for insertion of bipolar plates 12, 22 therein.

For the bipolar plates 12, 22 applied to the positive cell and the negative cell 20, conductive plates which are generally used in the art may be used.

Preferably, conductive graphite plates may be used for the bipolar plates 12, 22. Preferably, graphite plates impregnated with phenol resin may be used for the bipolar plates 12, 22.

When an untreated graphite plate is used, a strong acid that has been used in the electrolytes may penetrate thereinto, therefore it is preferred that a graphite plate impregnated with phenol resin is used for preventing penetration of the strong acid thereinto.

A separating membrane 30 is formed between the positive cell 10 and the negative cell 20. The separating membrane 30 separates positive electrolytes and negative electrolytes when charging and discharging the battery, and selectively allows movement only for ions when charging and discharging the battery. Such separating membrane 30 is generally used in the art, and not especially limited.

In a redox flow battery according to the above describe structure, a redox couple which is generally used in the art may be used as positive electrolytes and negative electrolytes. For example, a $V^{4+}/V^{5+}$ couple may be used as a positive electrolyte, and a $V^{2+}/V^{3+}$ couple may be used as a negative electrolyte.

A positive manifold 11 applied to a positive cell 10 and a negative manifold 21 applied to a negative cell 20 according to the present invention are identical in structure, and may have following structures; for convenience it will be simply referred to as 'manifold' and described hereinafter.

Figure 3:
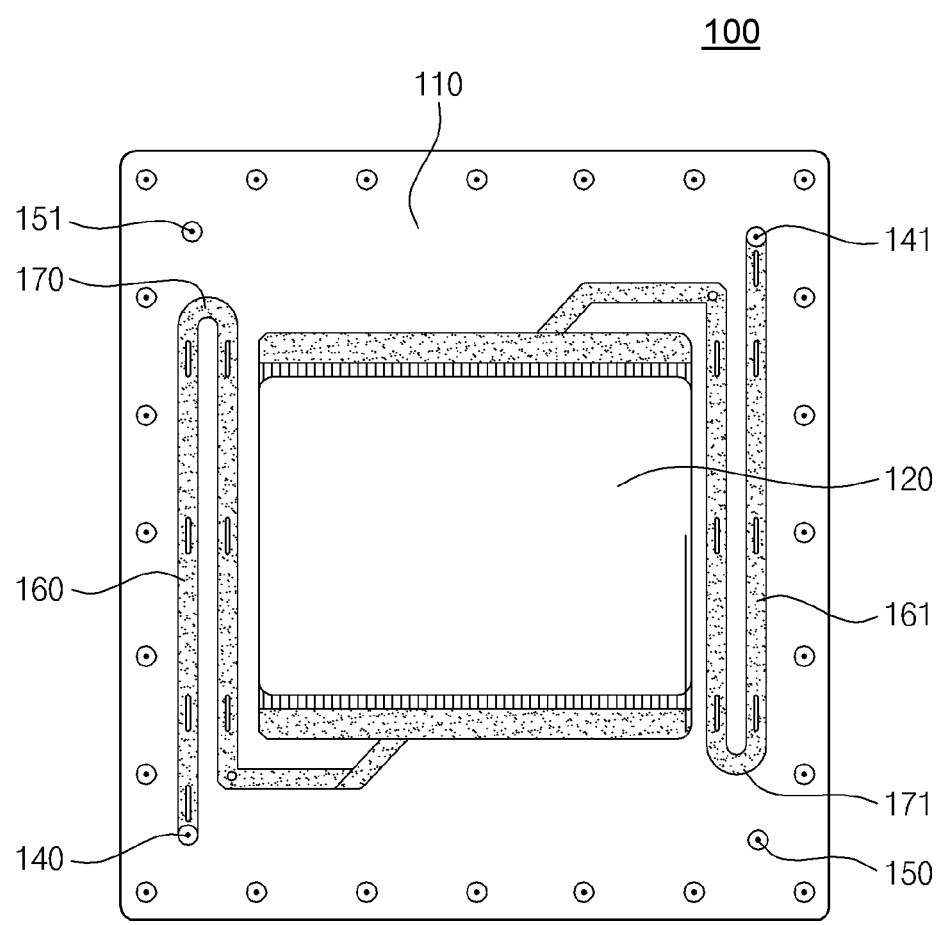
FIG. 3 is a front view showing a structure of a manifold for a redox flow battery according to the present invention.

FIG. 3 is a front view showing a structure of a manifold for a redox flow battery according to the present invention.

As illustrated in FIG. 3, a manifold 100 according to the present invention is formed on one side or both side, more preferably on one side of the plate 110, and includes: a first electrolyte inlet 140 and a first electrolyte outlet 141 for supplying and exhausting the first electrolyte; a first electrode electrolyte reactor 120; a supplying flow path 160; an exhausting flow path 161; a second electrolyte inlet 150; and a second electrolyte outlet 151.

More specifically, the manifold 100 includes: a first electrode electrolyte inlet 140 and a first electrode electrolyte outlet 141 for supplying and exhausting of the first electrode electrolyte; a first electrode electrolyte reactor 120, which is installed inside; a supplying flow path 160 for supplying the first electrode electrolyte injected from the first electrode electrolyte inlet 140 into the first electrode electrolyte reactor 120; an exhausting flow path 161 for moving the first electrode electrolyte of the first electrode electrolyte reactor 120 to the first electrode electrolyte outlet 141, and exhausting therefrom; and a second electrode electrolyte inlet 150 and a second electrode electrolyte outlet 151 for moving the second electrode electrolyte.

At this moment, the supplying flow path 160 and the exhausting flow path 161 include U-bends 170, 171, one at each side, i.e. left side and right side, of the first electrode electrolyte reactor 120, and the U-bends 170, 171 are formed to be positioned above the top end or below the bottom end of the first electrode electrolyte reactor 120 respectively.

At here, the first electrode electrolyte and the second electrode electrolyte may be a positive electrolyte or a negative electrolyte.

That is, the second electrode electrolyte may be a negative electrolyte when the first electrode electrolyte is a positive electrolyte, and the second electrode electrolyte may be a positive electrolyte when the first electrode electrolyte is a negative electrolyte.

In other words, in a redox flow battery, a manifold 100 according to the present invention may be applied to both of the positive cell 10 and the negative cell 20; when it is applied to a positive cell 10, the first electrode electrolyte is a positive electrolyte and the second electrode electrolyte is a negative electrolyte; and when it is applied to a negative cell 20, the first electrode electrolyte is a negative electrolyte and the second electrode electrolyte is a positive electrolyte.

Any plate generally used in the art may be used for the plate 110 constituting the body of the manifold 100 without limitation. For example, the plate 110 may be formed by using resins such as polyethylene (PE), polypropylene (PP), polystyrene (PS), polyvinyl chloride (PVC), and the like, and PVC is preferred considering the price, availability of procurement, and the like.

The first electrode electrolyte inlet 140, the first electrode electrolyte outlet 141, the second electrode electrolyte inlet 150, and the second electrode electrolyte outlet 151 are formed to be connected to the electrolyte inlet 52 and the electrolyte outlet 51 which are formed in the end plate 50 as illustrated in FIG. 2, and the electrolytes are being supplied and exhausted by driving the pumps.

At this time, the electrolytes contained in the electrolyte tank are being circulated by driving the pumps since the electrolyte inlet 52 and the electrolyte outlet 51, which are formed in the end plate 50, are connected to the electrolyte tank. During this process the electrolytes are being circulated through the first electrode electrolyte inlet 140 and the first electrode electrolyte outlet 141, and the second electrode electrolyte inlet 150 and the second electrode electrolyte outlet 151.

A first electrode electrolyte reactor 120 is formed inside of the plate 110, and a felt electrode, i.e. a positive felt electrode 13 or a negative felt electrode 23 may be attached at the first electrode electrolyte reactor 120.

In order to facilitate attachment of the felt electrodes 13, 23, the first electrode electrolyte reactor 120 is formed to have a groove or a hole in the plate 110, and the negative felt electrode 23 or the positive felt electrode 13 may be inserted into the groove or the hole to be fixed thereto (refer to FIG. 2).

Oxidation and reduction reactions are occurring inside the first electrode electrolyte reactor 120 as the first electrolyte is flowing in the felt electrodes 13, 23.

The first electrode electrolyte reactor 120 is connected to a supplying flow path 160, which is for receiving the first electrode electrolyte injected from the first electrode electrolyte inlet 140, and an exhausting flow path 161, which is for moving the first electrode electrolyte of the first electrode electrolyte reactor 120 to the first electrode electrolyte outlet 141 and exhausting therefrom.

According to the present invention, the supplying flow path 160 and the exhausting flow path 161 include U-bends 170, 171 one at each side, i.e. left side and right side, of the first electrode electrolyte reactor 120; and the U-bends 170, 171 are formed to be positioned above the top end or below the bottom end of the first electrode electrolyte reactor 120 respectively.

By providing the U-bends 170, 171 having such structures, the generation of a shunt current may be suppressed since the electrolytes existing inside of the stack and the pipes cannot pass the U-bends 170, 171, thereby blocking the movement of the electrolytes through the flow paths or the pipes and the like when the operation of the pumps (of the redox flow battery) is stopped.

In other words, even when the standby time of the redox flow battery, which is being kept in a charged state, is getting longer, the generation of a shunt current can be suppressed by blocking the movement of the large amount of electrolytes remaining in the flow path, which is a moving path of the electrolytes, towards the first electrode electrolyte reactor 120, thereby minimizing the occurrence of self-discharge.

At this time, if the U-bends 170, 171 are positioned lower than the top end of the first electrode electrolyte reactor 120 or above the bottom end thereof, the electrolytes may pass through the U-bends 170, 171 due to the high pressure of the first electrode electrolytes which is remaining in the first electrode electrolyte reactor 120. Therefore, it is preferred that the U-bends 170, 171 are positioned above the top end or below the bottom end of the first electrode electrolyte reactor 120.

Preferably, the supplying flow path 160 and the exhausting flow path 161 may be formed as illustrated in the drawing.

It may be that the first electrode electrolyte inlet 140 is formed at the lower left corner of first electrode electrolyte reactor 120; one end portion of the supplying flow path 160 is connected to the first electrode electrolyte inlet 140 while the other end portion thereof is connected to the lower end portion of the first electrode electrolyte reactor 120; the U-bend 170 formed in the supplying flow path 160 is being bent from the top left side of the first electrode electrolyte reactor 120 towards downward direction; the first electrode electrolyte outlet 141 is being formed at the top right of the first electrode electrolyte reactor 120; one end portion of the exhausting flow path 161 is connected to the first electrode electrolyte outlet 141 while the other end portion thereof is connected to the top end portion of the first electrode electrolyte reactor 120; and the U-bend 171 formed in the exhausting flow path 161 is being bent from the bottom right side of the first electrode electrolyte reactor 120 towards upward direction.

In addition, the supplying flow path 160 and the exhausting flow path 161 may be formed to have a structure wherein the left and the right sides of those illustrated in the drawing are interchanged.

In other words, it may be that the first electrode electrolyte inlet is formed at the lower right corner of first electrode electrolyte reactor 120; one end portion of the supplying flow path is connected to the first electrode electrolyte inlet while the other end portion thereof is connected to the lower end portion of the first electrode electrolyte reactor; the U-bend formed in the supplying flow path is being bent from the top right side of the first electrode electrolyte reactor towards downward direction; the first electrode electrolyte outlet is being formed at the top left of the first electrode electrolyte reactor; one end portion of the exhausting flow path is connected to the first electrode electrolyte outlet while the other end portion thereof is connected to the top end portion of the first electrode electrolyte reactor; and the U-bend formed in the exhausting flow path is being bent from the bottom left side of the first electrode electrolyte reactor towards upward direction.

The manifold 100, which includes the U-bends 170, 171 having such structures, may be useful for the redox flow battery, and the redox flow batteries, which include the manifolds of such structure, may suppress the generation of a shunt current since the electrolytes existing inside of the stack and the pipes cannot pass the U-bends 170, 171, thereby blocking the movement of the electrolytes through the flow paths or the pipes and the like when the operation of the pumps (of the redox flow battery) is stopped.

According to the present invention, the first electrode electrolyte reactor 120, the supplying flow path 160, and the exhausting flow path 161 are formed on one side of the plate 110, and a bipolar plate 12 or 22 may be attached to the backside thereof.

For example, as illustrated in FIG. 2, the bipolar plate 12 or 22 may be formed to be in contact with the backside of the positive manifold 11 or the negative manifold 21, or, though not shown in the drawing, a backside groove may be formed on the backside of the plate 110, and the bipolar plate 12 or 22 may be inserted into the backside groove.

At this time, it is preferred that the bipolar plate 12 or 22 may have larger area than the area of the first electrode electrolyte reactor 120 in order to prevent crossing of the electrolytes.

In the foregoing description, the present invention is described using a drawing as an example, however, this is provided merely to assist the understanding of the present invention, the present invention will not be limited to this, and those skilled in the art will understand that various changes and alterations are possible based on this description.

Accordingly, the present invention comprehensively includes all such alternatives, modifications, alterations, and changes which belong to the spirits and the scopes of attached claims.

The invention claimed is:

1. A manifold for a redox flow battery, comprising:
   a first electrode electrolyte reactor installed in a vertical direction, the first electrode electrolyte reactor having a top end portion, a bottom end portion, a left side end portion and a right side end portion;
   a first electrode electrolyte inlet formed at a position lower than the bottom end portion;
   a supplying flow path for supplying a first electrode electrolyte into the first electrode electrolyte reactor, one end of the supplying flow path being connected to the first electrode electrolyte inlet and the other end thereof being connected to the bottom end portion, wherein the supplying flow path includes an upper U-bend formed at a position higher than the top end portion, a first supplying flow path extending from the one end of the supplying flow path to the upper U-bend, and a second supplying flow path extending from the upper U-bend to the other end of the supplying flow path;
   a first electrode electrolyte outlet formed at a position higher than the top end portion; and
   an exhausting flow path for exhausting the first electrode electrolyte from the first electrode electrolyte reactor, one end of the exhausting flow path being connected to the first electrolyte outlet and the other end thereof being connected to the top end portion, wherein the exhausting flow path includes a lower U-bend formed at a position lower than the bottom end portion, a first exhausting flow path extending from the one end of the exhausting flow path to the lower U-bend, and a second exhausting flow path extending from the lower U-bend to the other end of the exhausting flow path.

2. The manifold for a redox flow battery according to claim 1, wherein the first electrode electrolyte inlet is formed at a lower left portion of the first electrode electrolyte reactor, and the upper U-bend is formed at an upper left portion of the first electrode electrolyte reactor, and wherein the first electrode electrolyte outlet is being formed at an upper right portion of the first electrode electrolyte reactor, and the lower U-bend is formed at a lower right portion of the first electrode electrolyte reactor.

3. The manifold for a redox flow battery according to claim 1, wherein the first electrode electrolyte inlet is formed at a lower right portion of the first electrode electrolyte reactor, and the upper U-bend is formed at an upper right portion of the first electrode electrolyte reactor, and wherein the first electrode electrolyte outlet is being formed at an upper left portion of the first electrode electrolyte reactor, and the lower U-bend is formed at a lower left portion of the first electrode electrolyte reactor.

4. The manifold for a redox flow battery according to claim 1, wherein a felt electrode is attached to the first electrode electrolyte reactor.

5. The manifold for a redox flow battery according to claim 1, wherein the first electrode electrolyte reactor is formed by forming a groove or a hole in a plate, and a felt electrode is inserted and fixed in the groove or the hole.

6. The manifold for a redox flow battery according to claim 5, wherein the first electrode electrolyte reactor, the supplying flow path, and the exhausting flow path are formed on one side of the plate, and a bipolar plate is attached to a backside thereof.

7. The manifold for a redox flow battery according to claim 6, wherein the bipolar plate is inserted into a backside groove formed on a backside surface of the plate, and the bipolar plate has a larger area than the first electrode electrolyte reactor.

8. The manifold for a redox flow battery according to claim 1, wherein the first electrode electrolyte is a positive electrolyte or a negative electrolyte, which is an opposite polarity of the first electrode electrolyte.

9. A redox flow battery comprising a manifold according to claim 1.

* * * * *